US010405016B2

(12) United States Patent
Singh et al.

(10) Patent No.: US 10,405,016 B2
(45) Date of Patent: *Sep. 3, 2019

(54) RECOMMENDING MEDIA ITEMS BASED ON TAKE RATE SIGNALS

(71) Applicant: NETFLIX, INC., Los Gatos, CA (US)

(72) Inventors: Angadh Singh, Pleasanton, CA (US); Carlos Gomez-Uribe, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/791,392

(22) Filed: Oct. 23, 2017

(65) Prior Publication Data

US 2018/0048925 A1 Feb. 15, 2018

Related U.S. Application Data

(63) Continuation of application No. 15/136,846, filed on Apr. 22, 2016, now Pat. No. 9,800,910, which is a (Continued)

(51) Int. Cl.
*G06F 3/00* (2006.01)
*G06F 13/00* (2006.01)
(Continued)

(52) U.S. Cl.
CPC ......... *H04N 21/252* (2013.01); *H04N 21/251* (2013.01); *H04N 21/25891* (2013.01);
(Continued)

(58) Field of Classification Search
CPC ............... H04N 21/251; H04N 21/252; H04N 21/25891; H04N 21/26258;
(Continued)

(56) References Cited

U.S. PATENT DOCUMENTS 8,229,873 B1 * 7/2012 Dolan ................... G06Q 30/00
706/45
8,447,760 B1 5/2013 Tong et al.
(Continued)

OTHER PUBLICATIONS

Hoi et al., "Semi-Supervised Ensemble Ranking", Proceedings of the Twenty-Third AAAI Conference on Artificial Intelligence (2008), pp. 634-639.

*Primary Examiner* — Mulugeta Mengesha
(74) *Attorney, Agent, or Firm* — Artegis Law Group, LLP

(57) ABSTRACT

In an approach, a method comprises using a server computer in a media content delivery system that is configured to selectively deliver a particular media title from among a library of titles, for a source title, generating title data that specifies an order of a plurality of titles that are related to the source title based on a plurality of stored probability values; wherein each probability value in the plurality of probability values represents, for each particular title of the plurality of titles, a likelihood of selecting the particular title after playing the source title; using the server computer, receiving title impression data, wherein the title impression data specifies a plurality of browsed titles that were browsed from among the plurality of titles but may have not been selected for interaction; using the server computer, receiving title interaction data, wherein the title interaction data specifies a plurality of selected titles that were selected for interaction from the plurality of browsed titles; based on the title interaction data, the title impression data and a statistical model, re-calculating the plurality of probabilities.

20 Claims, 7 Drawing Sheets

Related U.S. Application Data continuation of application No. 14/259,784, filed on Apr. 23, 2014, now Pat. No. 9,338,489.

(51) Int. Cl.
| | |
|---|---|
| *H04N 5/445* | (2011.01) |
| *H04N 21/25* | (2011.01) |
| *H04N 21/258* | (2011.01) |
| *H04N 21/61* | (2011.01) |
| *H04N 21/262* | (2011.01) |
| *H04N 21/2668* | (2011.01) |
| *H04N 21/482* | (2011.01) |

(52) U.S. Cl.
CPC ... *H04N 21/2668* (2013.01); *H04N 21/26258* (2013.01); *H04N 21/4825* (2013.01); *H04N 21/4826* (2013.01); *H04N 21/6125* (2013.01)

(58) Field of Classification Search
CPC ......... H04N 21/2668; H04N 21/44222; H04N 21/44204; H04N 21/4825; H04N 21/4826; H04N 21/6125
See application file for complete search history.

(56) References Cited

U.S. PATENT DOCUMENTS

| | | | |
|---|---|---|---|
| 2008/0147711 A1* | 6/2008 | Spiegelman | G06F 17/3002 |
| 2008/0294617 A1 | 11/2008 | Chakrabarti et al. | |
| 2008/0313168 A1 | 12/2008 | Liu et al. | |
| 2010/0280985 A1 | 11/2010 | Duchon et al. | |
| 2013/0013458 A1* | 1/2013 | Uribe | G06Q 30/0201 |
| | | | 705/26.64 |
| 2015/0312603 A1 | 10/2015 | Singh et al. | |

\* cited by examiner

RECOMMENDING MEDIA ITEMS BASED ON TAKE RATE SIGNALS

CROSS-REFERENCE TO RELATED APPLICATIONS

This application is a continuation of the co-pending U.S. patent application titled, "RECOMMENDING MEDIA ITEMS BASED ON TAKE RATE SIGNALS," filed on Apr. 22, 2016 and having application Ser. No. 15/136,846, which is a continuation of U.S. patent application titled, "RECOMMENDING MEDIA ITEMS BASED ON TAKE RATE SIGNALS," filed on Apr. 23, 2014 and having application Ser. No. 14/259,784. The subject matter of these related applications is hereby incorporated herein by reference.

FIELD OF DISCLOSURE

The present disclosure generally relates to computer-based techniques for generating contextual content recommendations in various kinds of content distribution systems. The disclosure relates more specifically to recommendation systems that employ techniques for recommending titles based on title take rate signals computed from data obtained from client computers of users of the systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.
Content Distribution Systems Content distribution systems offer a large variety of media items to the user for viewing. To enhance the user experience, content distribution systems may provide personal media recommendations to the individual user. One approach to recommending a media item involves determining media items of interest to the individual user based on the preferences of similar users using collaborative filtering or related techniques. One drawback of this approach however, is that a large amount of data needs to be stored and managed in order to determine similar users, making such an approach inappropriate in some situations.

Another approach is to identify media items that are similar to media items previously interacted with by the user. One implementation of such a recommendation system may involve attaching metadata tags to media items, such that media items having the same metadata tags are deemed to be similar. However, given the large variety of media available, thousands of metadata tags are needed to accurately describe the contents of media items.

Managing the metadata tags and performing similarity computations based on the multitude of tags usually needs large amounts of processing power and storage space. In addition, because metadata tags are often attached to a media item based on the perceptions of an individual, the tags may not accurately describe the contents of the media item, and, therefore, any similarity computation performed based on the tags may not be accurate. Further, the set of metadata tags that optimally determine similarity of media items and/or the extent to which each tag should contribute to this similarity typically varies depending on the actual content being evaluated, making global scoring functions based on metadata tags sub-optimal, and content specific ones difficult to estimate.

DETAILED DESCRIPTION

Figure 1:
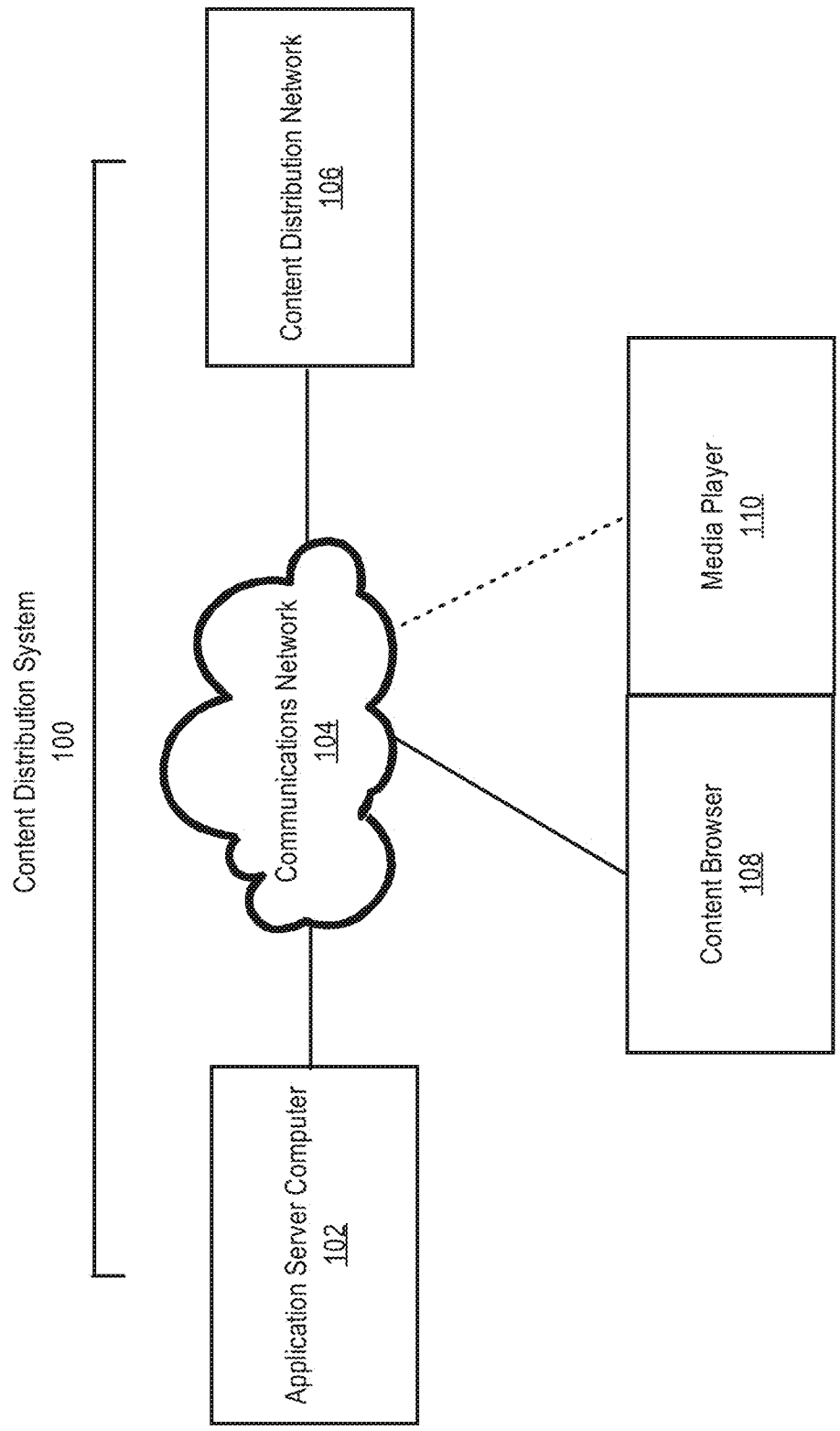
FIG. 1 illustrates an example operating environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
3.0 Example Application Server Computer
4.0 Take Rate Signal
5.0 Take Rate Signal in Context of Other Media Titles
6.0 Other Similarity and Popularity Indicators
7.0 Probability Generator Functional Overview
8.0 Recommendation Engine Functional Overview
9.0 Title Recommendation Display
10.0 Alternative Contexts and Uses
11.0 Hardware Overview
12.0 Extensions and Alternatives

1.0 General Overview

This disclosure assumes familiarity with the approach to recommending content that is described in application Ser. No. 13/590,071, filed Aug. 20, 2012, titled "Identifying Similar Items Based on Interaction History", by Gomez Uribe et al. (the '071 application), which is hereby incorporated by reference for all purposes as though fully stated herein. This disclosure assumes familiarity with the approach to recommending content that is described in application Ser. No. 13/829,064, filed Mar. 14, 2013, titled "Personalized Markov Chains", by Gomez Uribe et al. (the '064 application), which is hereby incorporated by reference for all purposes as though fully stated herein. Markov chains as described in the '071 application and '064 application may be improved using a take rate signal in recommending content as further described herein.

In an embodiment, a take rate signal is information derived from recording user interactions with a system relating to viewing, playing, renting or otherwise taking a content item. In an embodiment, a content distribution system may present media items to a user in form of media titles and may serve title data that contains media titles from a library of media titles to a content browser and player of the user. Title data may contain media items and metadata associated with them, such as a description of a title, current rating of the title, and a number of plays for the title. Title data may vary in size as title data may contain a single media title or may contain a media library as described below. In an embodiment, only a portion of the media library may be presented to a user, due to the size of a media library, constraints of a graphical user interface display, latency or resource constraints.

The user may or may not browse through all the presented media titles before making a decision as to which media title to play. In an embodiment, a content distribution system may have a media library of thousands of media titles that may be subdivided into genres, such as action, family, comedy, or sci-fi. In response to user requests to browse the comedy genre media titles, the content distribution system may send to the content browser, for example, only the first 100 comedy media titles as part of the title data. Upon receiving the 100 media titles, the content browser may only be able to display to the user 10 media titles on the initial screen because of display space constraints. In order to browse the rest of the media titles, the user may have to request the content browser to display those titles by an action such as scrolling, hovering the mouse towards the end of the displayed media titles, or clicking a "next" button.

In an embodiment, a content browser may record media titles that are browsed by a user as part of impression data. Browsed media titles may include the media titles that have been initially displayed to the user on the initial screen, so that they were visible to the user, as well as the media titles that have been browsed by the user through an affirmative user action. In an embodiment, in addition to browsed media titles, the title impression data may further contain user information, browsing context information, such as locations/pages/arrangements in content browser where browsed media titles resided, timestamp of browsing, as well as additional information about browsed media titles. The title impression data may be stored locally, for example, using logs maintained by the content browser. In a related embodiment, the content distribution system may receive the title impression data by initiating a request to the content browser or by the content browser initiating a request to transmit the title impression data to the content distribution system on a periodic or asynchronous basis.

A content browser may also record a user's interactions with media titles, in an embodiment. When a user requests an interaction with a particular media title from browsed titles, the content browser may record an interaction. In an embodiment, in response to the user interaction with a media title, a media player may play the media item associated with the media title. Or, the user interaction with a media title may merely request the delivery of the media item associated with the media title through a communication network or other means such as mail.

The content browser may record the title associated with an interaction as part of title interaction data. In an embodiment, in addition to the media title, title interaction data may contain user information, interaction context information, such as locations, pages or arrangements in the content browser from which the interacted media title has been played, timestamp of interaction, duration of the interaction, as well as additional information about the interacted media title.

Based on the title interaction data and the title impression data, a take rate signal may be derived for a title. In an embodiment, the take rate signal represents information about the relationship between the content that is displayed to users of a system, and user interactions with the displayed content. For example, the take rate for a particular title may increase when the number of interactions with the particular title increases, and may decrease when the particular title is visible to the user and/or browsed over without an interaction. In an embodiment, a take rate signal may be represented by a ratio of number of times a particular title has been interacted with by users over the number of times the particular title has been visible to and/or browsed over by users. In another embodiment, a take rate signal may be represented by the total number of hours that a particular title has been played over the number of times the particular title has been browsed over. Additionally or alternatively, the take rate signal may be derived from a quantified interaction of users with available and browsed media titles.

In an embodiment, a take rate signal may be incorporated into logical units, computations or calculations that determine a recommendation display of media titles that are recommended for a user, in the abstract or in the context of another media title. When a user interacts with a media title, the content distribution system may determine the user may be interested in similar media titles. A content browser may display the similar media titles in a selection window as recommendations based on the previously interacted title, source title or other factors. The content browser may utilize the take rate signals of similar media titles to arrange the similar titles in a descending order of probability values. In an embodiment, each title is associated with a probability value indicating a likelihood that the user will interact with that title, based upon past actual interactions, preferences or other factors. For example, a content distribution system may infer that a user who requested to watch the movie "Sherlock Holmes" may also be interested in watching "Monk" or "Poirot". The "Monk" and "Poirot" titles may be displayed to a user in a selection window described as "Because you watched Sherlock Holmes." The media titles may be arranged based in part on the take rates of "Monk" and "Poirot" in the context of "Sherlock Holmes".

According to one technique, the probability of a user interacting with a particular media title after an interaction with a source title may be estimated through Markov chain state transition probabilities. The content distribution system may arrange the media titles in a recommendations display of the content browser in a particular order using Markov chain transition probabilities to improve the accuracy of recommendations and the likelihood of a user interacting with a particular title without further browsing or searching.

A Markov chain is a mathematical system that undergoes state transitions. In many cases, a Markov chain represents a discrete-time process involving a system which is in a certain state at each step, with the state changing randomly between the steps. The steps may represent moments in time, but can refer also to physical distance, number of iterations, or any other discrete measurement. The Markov property states that the conditional probability distribution for the system at the next step (and all future steps) depends only on the current state of the system, and not additionally on the state of the system at previous steps.

Markov chains may be utilized as a single Markov chain. In a single Markov chain, only a single state transition is considered: from a current state to any of destination states. Each transition from the current state to a destination state has an associated conditional transition probability for the step. For example, a single Markov chain may consist of three states (1,2,3) and have a current state of 1 where the probability $p_{i,j}$ of transitioning from state i=1 to state j during the next step are denoted by $p_{1,1}$, $p_{1,2}$, $p_{1,3}$. Since the system will always transition from state i=1 to at least some state j, the sum of the probabilities $p_{1,1}$, $p_{1,2}$, $p_{1,3}$ is always equal to 1 (100% probability).

In an embodiment, a logistic regression model may be used to support accurately predicting the likelihood of a user interaction or transition. A logistic function may be derived for representing the probability of a user interacting with a particular title after interacting with a source title. In the logistic function, the binomial outcome of whether a user interacts with a particular title after interacting with a source media title may serve as the dependent variable, and the take rate signal may be used as an independent variable for the logistic regression function. According to this approach, through a regression of a known representative sample of user interactions and impressions of media titles from a media library, the logistic function may accurately approximate the probability of transition from interacting with a source media title to interacting with a particular title.

A logistic regression model is a type of a mathematical regression model that is used to predict a binary response. In general, regression model is a statistical method that is used for estimating a relationship between variables. Regression model can be used to predict how a particular dependent variable may change based on variations in independent variables. To estimate a dependent variable value, a regression function of unknown parameters and independent variables is defined. To derive the regression function, a representative sample of known outcomes is regressed to determine the values of the unknown parameters. Once derived, the regression function then can be evaluated to produce an approximation of dependent variable value.

The output of a logistic regression model is typically a binomial regression that deals with a dependent variable that can have only two possible values. Typically, the two possible values of the dependent variable are zero and one. Thus, a logistic regression function describes the probability of the dependent variable evaluating either to zero or one. Such logistic regression function takes a form of:

$$\log \frac{F(x)}{1 - F(x)} = \beta_0 + \beta_1 x_1 + \beta_2 x_2 + \ldots + \beta_m x_m$$

where $F(x)$ is the logistic regression function that evaluates to the probability of the dependent variable having value zero or one; $x_1 \ldots x_m$ are the independent variable; and $\beta_0 \ldots \beta_m$ are the unknown coefficients that may be derived by regressing sample data.

The logistic regression model as applied to state transition may represent whether the state transition would occur or not. A dependent variable value of one would represent the occurrence of such transition, while the value of zero would represent non-occurrence of the transition. Thus, $F(x)$, logistic function may represent the probability $p_{i,j}$ of transitioning from state i to state j. Such transition may depend on various fixed factors that may be represented in the logistic regression function as $x_1 \ldots x_m$. Sample data on the i to j state transition may then be used to determine $\beta_0 \ldots \beta_m$, the unknown coefficients.

In an embodiment, a method comprises using a server computer in a media content delivery system that is configured to selectively deliver a particular media title from among a library of titles, for a source title, generating title data that specifies an order of a plurality of titles that are related to the source title based on a plurality of stored probability values; wherein each probability value in the plurality of probability values represents, for each particular title of the plurality of titles, a likelihood of selecting the particular title after playing the source title; using the server computer, receiving title impression data, wherein the title impression data specifies a plurality of browsed titles that were browsed from among the plurality of titles; using the server computer, receiving title interaction data, wherein the title interaction data specifies a plurality of selected titles that were selected from the plurality of browsed titles; based on the title interaction data, the title impression data and a statistical model, re-calculating the plurality of probabilities; wherein the method is performed by one or more computing devices.

In other embodiments, the invention encompasses a computer apparatus and a computer-readable medium configured to carry out the foregoing steps. Various embodiments are summarized in and set forth in the appended claims.

2.0 Example Operating Environment

FIG. 1 illustrates an example operating environment upon which an embodiment may be implemented. In FIG. 1, a content distribution system 100 includes an application server computer 102, a communications network 104, a content distribution network (CDN) 106, a content browser (CB) 108, and a media player (MP) 110. For convenience, only a particular number of each of the aforementioned elements is depicted in FIG. 1. However, a practical environment may have many more, perhaps thousands or millions, of the aforementioned elements. Furthermore, in an embodiment, CB 108 and MP 110 may be integrated as one component.

The communications network 104 includes a plurality of network communication systems, such as routers and switches, configured to facilitate data communication between the application server computer 102, the CDN 106 and the CB 108. In an embodiment, MP 110 may be independently connected to the communication network 104. In another embodiment, MP 110 may not be connected to the communication network 104, and media titles may be independently delivered to MP 110 for playing through other means.

In an embodiment, communications network 104 represents any combination of one or more local networks, wide area networks, internetworks, or service provider networks. In some embodiments, communications network 104 represents the Internet. The nodes of communications network 104 may send messages using any number of protocols, such as network layer protocols (e.g. IP, MPLS, IPsec, etc.), transport layer protocols (e.g. TCP, UDP, etc.), and/or application layer protocols (e.g. FTP, SSH, TLS, HTTP, etc.). However, the exact protocol or combination of protocols used to deliver messages across communications network 104 is not critical to the techniques described herein.

The application server computer 102 is a computer system configured to host a web application that is accessed by the CB 108. In an embodiment, the web application hosted by the application server computer 102 allows a user of CB 108 to browse through available content, manage account information, receive content recommendations, etc. Further, application server computer 102 is configured with the functional units shown in FIG. 2 and discussed below that implement the techniques described herein.

The CDN 106 comprises one or more computer systems configured to serve download requests for media titles from the CB 108 to MP 110, in an embodiment. The media titles may reside on a mass storage system accessible to the CDN 106. The mass storage system may include, without limitation, direct attached storage, network attached file storage, or network attached block-level storage. The media titles may be formatted and stored on the mass storage system using any technically feasible technique. A data transfer protocol, such as HTTP, may be used to download media titles from the CDN 106 to the CB 108 or the MP 110.

The MP 110, in various embodiments, may be a separate entity from CB 108 and comprises a computer system, a set top box, a mobile device such as a mobile phone, user application, or any other technically feasible platform that is coupled to or include a display device and/or speaker device for presenting video frames, and generating acoustic output respectively. In an embodiment, where the MP 110 does not have network connectivity, media titles from CDN 106 are delivered through other means such as a standard mail or a courier service.

The CB 108, in various embodiments, comprises a computer system, a set top box, a mobile device such as a mobile phone, user application, or any other technically feasible platform that has network connectivity and is coupled to or includes a display device for presenting video frames. The CB 108 interacts with the application server computer 102 and the CDN 106 to display available content information such as media titles from a media library, gather user preferences, request playing or a delivery of media titles, etc.

3.0 Example Application Server Design

Figure 2:
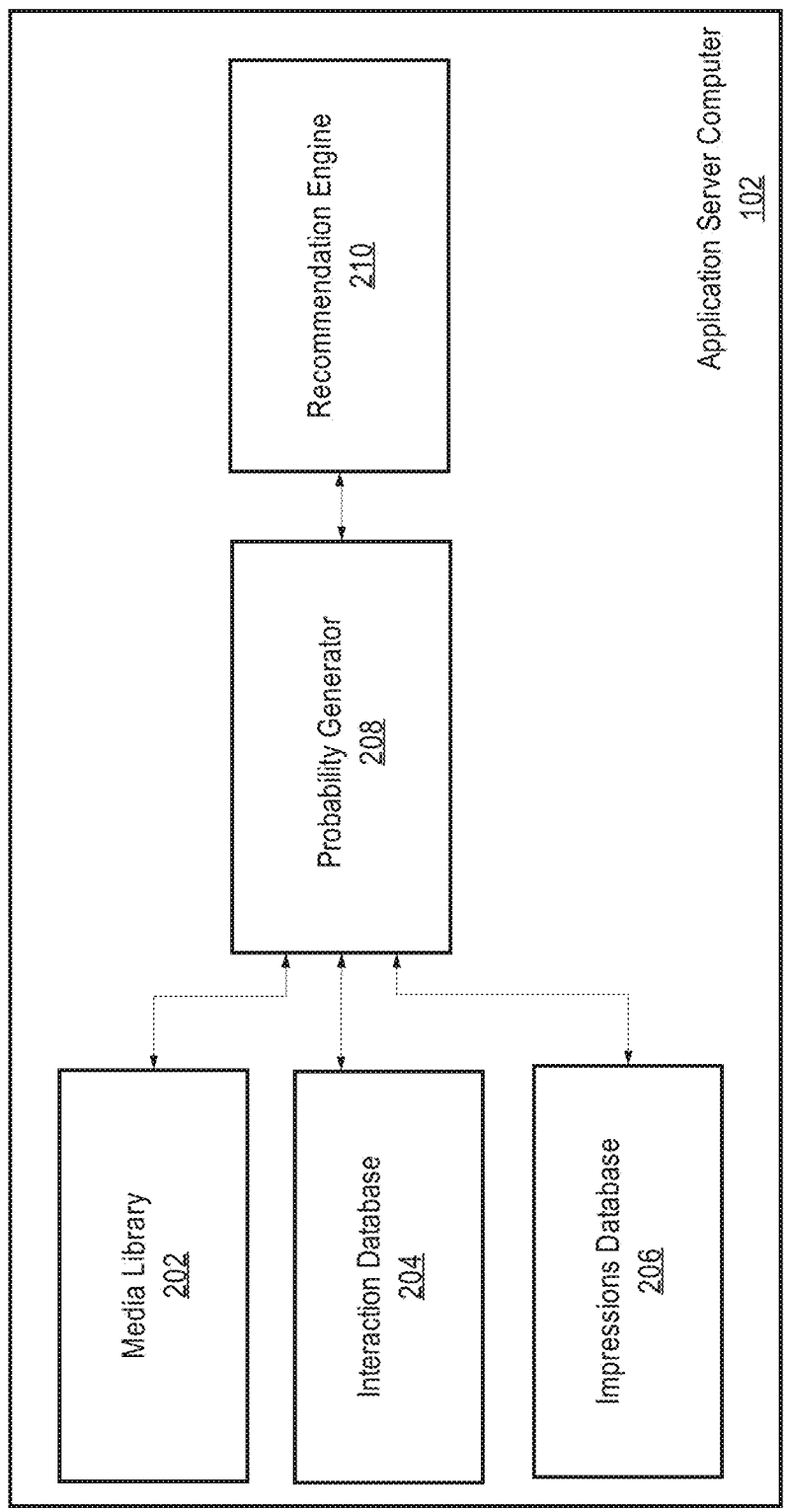
FIG. 2 illustrates an application server according to an embodiment.

FIG. 2 is a block diagram of the application server computer 102 of FIG. 1. In an embodiment, the application server computer 102 includes a media library 202, an interaction database 204, an impression database 206, a probability generator 208, and a recommendation engine 210.

The media library 202 includes a list of media titles with which users of the application server interact. An interaction with a media title may include a user action on a media title, such as playing the media title, requesting media title to be delivered, rating the media title, adding a media title to a set of media titles of interest (such as a preference queue), searching for a media title in a search engine, or even clicking or otherwise navigating to a more detailed description of a media title. A combination of different interaction types may be stored.

Media titles may include audio-video data, such as movies or TV shows, image data, such as photographs, or audio-only data, such as songs. However, the exact type of data that the media titles represent is not critical to the techniques described herein. In an embodiment, the media library 202 may include only references to media titles that are stored within the CDN 106 for distribution to users of the CB 108.

The interaction database 204 stores media title interaction data related to users of the content distribution system 100. In the case of the CB 108, in an embodiment, each time a user interacts with a particular media title via the CB 108, the interaction is recorded in the interaction database 204. In some embodiments, along with information identifying the media title, the records may include user identity information, the time and date of each interaction, the duration of interaction, and/or metadata about the user, etc. For other types of interactions, the strength of the interaction may be stored. For example, if the interaction is a rating, then the rating value may be stored. Based on recorded interactions, a history of user interaction may be determined. For example, based on two consecutive interactions from the same user, a transition from a media title i to a media title j may be recorded.

The impression database 206 stores the title impression data related to users of the content distribution system 100. In the case of the CB 108, each time a user browses over a particular media title or is capable of seeing a media title via the CB 108, user impressions of media titles are recorded in the impression database 206. In some embodiments, along with information specifying the media title, the records may also include the user information, the time and date of each browsing, context of such browsing such as a particular page or window in the CB 108, etc. In an embodiment, the title impression data may further contain information identifying the browsed media titles that the user interacted with. To represent an interacted media titles from browsed media titles, the title impression data may contain a pointer to an entry in the interaction database 204 corresponding to the interacted media title. Based on recorded impressions and interactions, a comprehensive history of browsing by users may be determined. For example, based on all interactions and impressions of media title j displayed in the CB 108, a take rate signal may be recorded for media title j based on the ratio of amount of interaction of media title j versus number of impressions of media title j. A more detailed description of take rate signal will be described later in Section 4.0 and 5.0.

The probability generator 208 is configured to compute probabilities for a particular media title in a context of other media titles. Such probabilities denote the likelihood that a user will interact with the particular media title compared to other media titles based on statistical similarity to the media title, or popularity of the media title, in comparison to other media titles in a particular context. In an embodiment, the probability generator 208 obtains as input title impression data and title interaction data on a media title from the impression database 206 and interaction database 204. From the aforementioned inputs, the probability generator 208 computes a statistical measurement of likelihood of interaction with the particular media title based in part on a take rate signal for the particular media title and other indicators of similarity or popularity in comparison with other media titles available on the CDN 106. A more detailed description of how the probability generator 208 computes the probabilities for media titles is described later in Section 7.0.

The recommendation engine 210 recommends media titles to users of the content distribution system 100, via the CB 108, based, at least in part, on the probabilities computed by the probability generator 208. For example, when a user interacts with media title i, the recommendation engine 210 recommends one or more media titles with probability scores to media title i that are above a particular threshold. As another example, the recommendation engine 210 may recommend media titles with the top N probability scores to media title i. Thus, the recommendation engine 210 presents users with recommendations of media titles that are determined to be statistically similar to a media title with which the user last interacted. A more detailed description of how the recommendation engine 210 recommends media titles will be described later in section 8.0.

In an embodiment, the media library 202, interaction database 204, impression database 206, probability generator 208, and recommendation engine 210 each may be implemented using one or more computer programs, other software elements, firmware, or a combination thereof that are hosted in or executed by a general-purpose computer. Alternatively, application server computer 102 may be configured as a special-purpose computer in which the probability generator 208 and recommendation engine 210 are implemented using special-purpose logic.

4.0 Take Rate Signal

A take rate signal for a particular media title describes a relationship between user interactions and impressions of the particular media title. The take rate signal increases with an increase in user interactions and decreases with an increase in user impressions that have no user interactions. To compute a take rate signal for a particular media title, the title impression data for the particular media title is selected from the impression database 206, and the title interaction data for the particular media title is selected from the interaction databases 204. In an embodiment, a take rate signal for a particular media title may be based on all impressions and interactions with such media title using the content distribution system. In other embodiments, various take rate signals may be computed for a particular media title based on a shared context of the selected title interaction data and title impression data.

Figure 3:
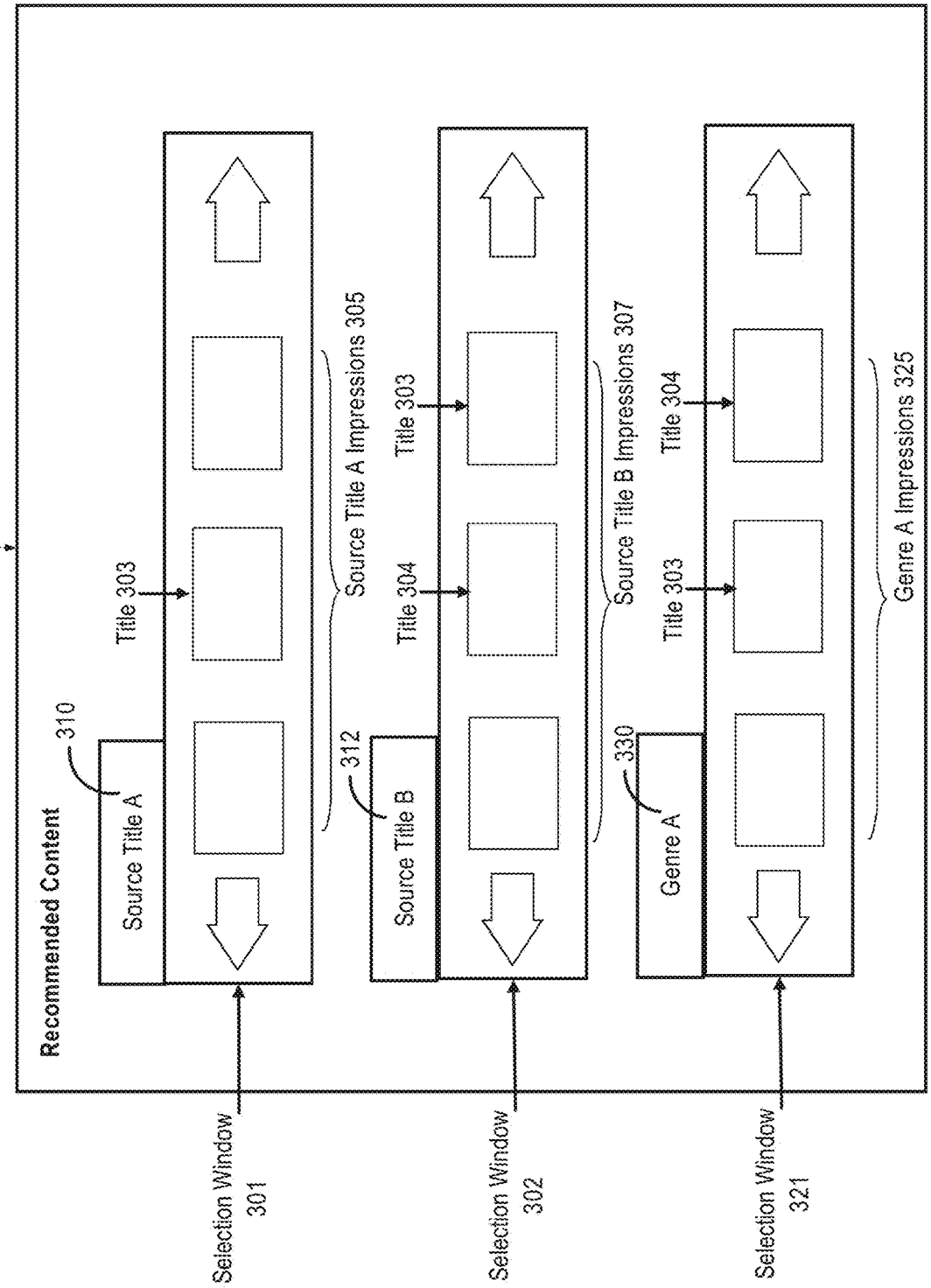
FIG. 3 illustrates an example user interface display for displaying one or more recommended titles according to an embodiment.

In an embodiment, the shared context may be a common location, page, or arrangement of media titles in a content browser that the selected impressions and interactions for a particular media title originated from. FIG. 3 illustrates an example of such recommendation display arrangement in a content browser. The display 300 contains recommended content based on source media titles, source title A 310 and source title B 312. The media titles recommended for each of the source media titles are displayed in the selection windows 301, 302 respectively. The media title 303 is displayed in the selection window 301, 302 in context of both the source title A 310 and the source title B 312 arrangements of media titles. Thus, a take rate signal in the context of source title A 310 may be computed for the media title 303 based on user impressions and interaction in the selection window 301. Similarly, a different take rate signal for the same media title 303, in the context of source title B 312, may be computed based on user interactions and impressions in the selection window 302.

In another embodiment, a shared context may be a common group of users that the selected impressions and interactions for a particular media title originated from. Such group of users may be based on geographical locality, such as all the users in the Northern America, or may be based on affiliations. Examples of affiliations may be users that are members of a particular organization or users that are related to each other through a social network. Furthermore, content distribution system may affiliate users into groups based on their interactions with the system. Such groups may consist of users that rated a media title very highly or watched the same media titles or had tendency to select media titles from the same genres.

A numerical representation of the take rate signal, termed a take rate, may be calculated from user interactions and user impressions for a particular title. In an embodiment, the number of user interactions is determined from the user interaction data selected for a particular media title from the interaction database. The number of user impressions may be determined from the user impression data selected from the impression database. Then, a take rate for the particular title may be calculated by the ratio of the number of user interactions over the number of user impressions. In some embodiments, a take rate may not take into account each and every user interaction for a particular title in the interaction database. For example, non-play based user interactions, such as rating the particular media title or commenting on the particular title, may not be counted towards the number of user interactions for the particular media title. In another example, play based user interactions may be further qualified based on the length of a media title play. Accordingly, user interactions with the particular media item may be counted towards the take rate of the particular media title, if the particular media title has been played for more than a specified duration of time. For example, if a user played a media title j for only a few seconds, the user interaction would not be counted towards the take rate for the media title j.

In another embodiment, a take rate for a particular media title may also be computed based on the length of interaction with the particular media title. The title interaction data selected from the interaction database may further contain a duration of each interaction for the particular media title. These durations may be summed up together to yield a total duration of interaction for the particular media title. The number of user impressions of the particular media title may be determined from the user impression data selected from the impression database. A duration based take rate may be computed by a ratio of the total duration of interactions over the number of impressions for the particular media title. In embodiments, a duration of interaction may be represented in time measurement units such as days, hours, minutes, or seconds and/or content measurement units such as frames.

5.0 Take Rate in Context of Other Media Titles

The take rate for a particular media title may be adjusted to account for presentation bias. The presentation bias occurs when a particular media title is presented and displayed far fewer than other media titles, and thus receives few user impressions. As such, the particular media title may have over-inflated or under-inflated take rate because the number of impressions is not statistically significant enough to accurately represent the take rate signal for the particular media title. For example, a small production movie title may have been displayed towards the end of a selection window scroll and may have only been browsed three times. However, out of the three times that the media title was browsed, the media title was requested for play two times. On the other hand, a popular movie title may be displayed toward the front of the selection window and may have been browsed by millions of times and may have been requested half of the time. According to this example, the popular movie would have far smaller take rate value than the small production movie because the presentation bias favors the small production title. Thus, in embodiments, where a particular media title is displayed in a context of other media titles in a recommendation display arrangement that takes into account a take rate of the displayed media titles, the particular media title may have inaccurate placement in the context of the other media titles as a result of the presentation bias.

In an embodiment, the presentation bias for a take rate signal associated with a particular media title may be corrected by adjusting the take rate to account for variances in user interactions and impressions. A standard error of user interactions for the particular media title may be used to adjust the take rate of the particular media title, where the standard error defines the confidence interval around the mean of user interactions. The mean of user interactions is equal to the take rate, if the take rate is based on the number of user interactions and impression of the particular media title. In such embodiments, the standard error may then be represented by:

$$\sigma = \sqrt{\frac{tr(1-tr)}{N_{imp}}}$$

where σ is the standard error of user interactions, tr is the take rate based on number of user interactions and impressions, and $N_{imp}$ is the number of user impressions for the particular title.

In a related embodiment, based on the standard error, the take rate may be adjusted to the lower bound of the confidence interval of user interactions. The adjusted lower bound take rate may be computed as:

$$tr_{lb} = tr - n \times \sigma$$

where tr is the original take rate and n is selected based on the desire range of the confidence interval.

Take rates for media titles may be further adjusted to be normalized based on a distribution of the take rate values for a set of media titles. In an embodiment, a set of media titles in a recommendation display arrangement may be placed based on each media title take rate and other indicators. If the take rates of the set vary greatly in their values, then the weight of the take rate as compared to the weight of other indicators may differ from one media title to another. For example, media titles j and k are displayed as similar titles in a recommendation display arrangement for a source media title i. The media titles j and k may have take rate values of 0.0011 and 0.0015 respectively. Although, it may seem that the 0.0004 difference between the take rate values is negligible, 0.0015 may be greater than 80% of take rate values for media titles displayed in the arrangement for the media title i, and 0.0011 may be greater than only 20% of other media title take rates displayed. Accordingly, if the take rate values for media titles j and k in context of i are not normalized, then the take rate difference between these two media titles may be easily overpowered by other similarity indicators and may yield inaccurate recommendation display arrangement of the media titles j and k in context of media title i. The normalization assures that the take rate preserves the proper weight when media titles are arranged with respect to each other.

In order to standardize the effect of take rates for media titles in a recommendation display arrangement, a cumulative distribution function may be used, in an embodiment. The cumulative distribution function is derived based on the take rate values of media titles in a context. The output of the cumulative distribution function for a particular take rate value is the probability value of finding take rate values below the particular take rate value. Thus, effectively the cumulative distribution function is a mapping of densities of take rate values for a set of media titles in the arrangement, where each take rate value is mapped to a normalized take rate value. The normalized take rate value may be represented by the following equation for the cumulative distribution function:

$$F_i(X_j) = Pr(tr \leq tr_{ij})$$

where $F_i(X_j)$ is the is the cumulative distribution function and normalized take rate of the media title j in the context of the media title i, and $Pr(tr \leq tr_{ij})$ is the probability value of finding other take rate values in the context of the media title i that are below the take rate value of the title j in the same context.

In a related embodiment, take rate values that are adjusted for presentation bias may be used as an input to the cumulative distribution function to map to normalized take rate values. Thus, the cumulative distribution function represents the probability value of finding adjusted lower bound take rate values below the particular adjusted lower bound take rate value. The cumulative distribution function for the media title j may be represented as:

$$F_i(X_j) = Pr(tr \leq tr_{lb}^{ij})$$

where $tr_{lb}^{ij}$ is the adjusted lower bound take rate for the media title j in the context of media title i.

Figure 4:
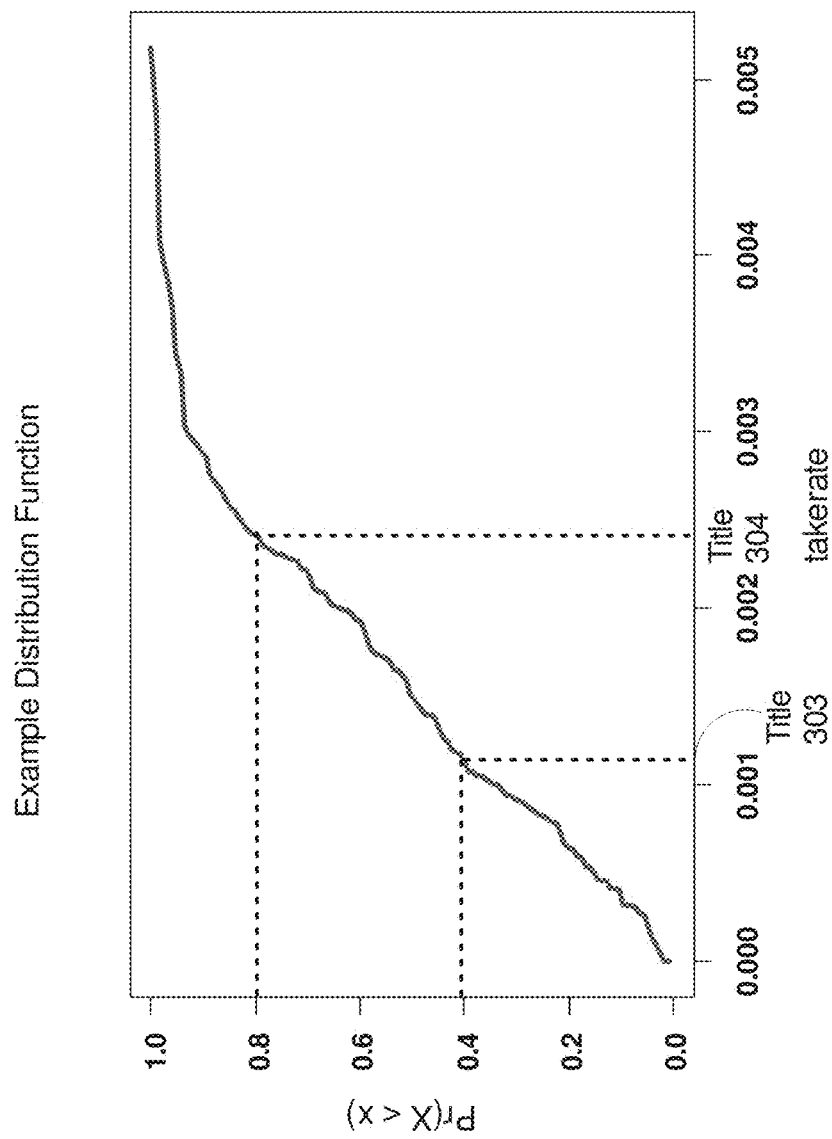
FIG. 4 illustrates an example of a cumulative distribution function for take rates of media titles in context of another media title according to an embodiment.

FIG. 4 illustrates an example cumulative distribution function for take rates of a set of media titles in a similarity context for the source title B 312 in FIG. 3, in an embodiment. The cumulative distribution function may have been derived from all the take rate values of the set of media titles that are similar to the source title B 312. In an alternative embodiment, the cumulative distribution function may have been derived from a representative set of the take rate values of media titles that are similar to the source title B 312. The resulting cumulative distribution function maps take rate values of media titles to a normalized value range from 0 to 1. For example, for media title 303, the take rate value of 0.0012 maps to a normalized value of 0.4, while for media title 304, the take rate value of 0.0024 maps to a value of 0.8. Accordingly, in the context of the source title B 312, the media title 303 has a normalized take rate value of 0.4, and the media title 304 has a normalized take rate value 0.8, respectively.

6.0 Other Similarity and Popularity Indicators

In an embodiment, the distribution system may use other similarity or popularity based recommendation indicators to recommend media titles to users in addition to a take rate signal, such as the indicators described in the '071 application and '064 application.

In an embodiment, the one or more of the following indicators may be used in conjunction with a take rate signal to improve identifying similar and popular media titles. The indicators are computed based on user interaction and impression data in the interaction and impression databases. In related embodiments, the indicators may be based on interaction and impression data from a subset of users. A subset of users may be based on geographic locality of users or user affiliations.

Transition probability (tp) is a similarity indicator denoting a probability that a user interacts with media title j after interacting with media title i.

$$tp = P(i \rightarrow j).$$

Transition probability may be calculated based on a ratio of the number of consecutive interactions with any media titles after an interaction with a media title i over the number of consecutive interactions of a media title j after an interaction with the media title i. In a related embodiment, if a delay occurs between interactions, such interactions may not be denoted as consecutive interactions or may be assigned a smaller weight.

Odds ratio (OR) is a ratio of probability that a media title j was interacted consecutively after a media title i due to similarity between these titles over the probability that the transition between these two titles is completely random. OR may be represented by the following equation:

$$OR(i, j) = \frac{P_{MC}(i \rightarrow j)}{P_R(i \rightarrow j)}$$

where $P_{MC}$ is the probability that such sequence of interactions will be on purpose and $P_R$ is the probability that the media title j will be interacted with after the media title i at random.

The probability of any random media title interaction is equal to the ratio of the number of interactions of the media title over the total number of interactions in the content distribution system. The probability of two consecutive interactions is calculated by multiplying the probability of the first interaction with the probability of the second interactions. Thus, OR may be further simplified to the following equation:

$$OR(i, j) = \frac{P_{MC}(i \rightarrow j)}{P_R(i \rightarrow j)} = \frac{P(j/i) \times P(i)}{P(i) \times P(j)} = \frac{P(j/i)}{P(j)}$$

where P(j) is the probability of the media title j interaction at random.

Therefore, an odds ratio greater than 1 implies title j is similar to title i and is more likely to be interacted in succession after title i than interacted at random. An odds ratio lower than 1 would mean that the two titles may rather be dissimilar.

Search odds ratio (sor) is defined similar to the odds ratio above, but describes a user search for a media title i followed by an interaction with a media title j. In a related embodiment, if a delay occurs between a search and an interaction such interaction may not be denoted as a transition or may be assigned a smaller weight in the calculation of sor.

Fraction of content viewed (fcv) is a popularity indicator based on an average interaction duration of a media title. Each interaction duration may be represented as a ratio of a duration of an interaction with a media title over a total possible interaction duration with the media title. For example, if a user plays 20 minutes of a 40 minute media title, the interactionfcv is 0.5. Then, an fcv may be calculated by averaging all interaction fcv's for the media title. In a related embodiment, an fcv may be represented by a lower bound of interaction fcv's, similar to the calculation of a lower bound take rate discussed above.

In an embodiment, a compound level fcv is based on an average interaction duration of a set of media titles that are part of a logical grouping of media titles. The logical grouping of media title may be a TV show season comprising of multiple episodes, or an album comprising of multiple tracks. Each interaction duration may be represented as a ratio of a total duration of interactions with media titles within the logical grouping over a total possible interaction duration with all media titles within the logical grouping. For example, if all episodes within a TV show add up to 400 minutes, and a user plays only 20 minutes, then the interaction compound level fcv would be 0.05. In a related embodiment, a compound level fcv may be represented by a lower bound of interaction compound level fcv's, similar to the calculation of a lower bound take rate discussed above. A media title that is a member of a logical grouping of media titles may have a combined fcv based on a combination of a compound level fcv for the logical grouping and its own fcv.

7.0 Probability Computation Engine Functional Overview

The probability generator 208 is configured to calculate various probabilities based on indicators that include a take rate signal to recommend media titles to a user through the content browser 108, in an embodiment. The calculated probabilities represent the likelihood of user interacting with a particular media item in a particular context. The context may be a previous media title interacted by the user, a genre of titles, or media titles recently added to the media library 202. The probabilities may be calculated by using statistical models that may utilize a take rate signal and other indicators. The probabilities computed by the models for media titles may be used to arrange the media titles in respect to each other in a page displayed using the content browser 108. In one embodiment, the probabilities may be calculated to denote the similarity measurement between media titles. In another embodiment, the probabilities may be calculated to denote the popularity of media titles with respect to each other.

Figure 5:
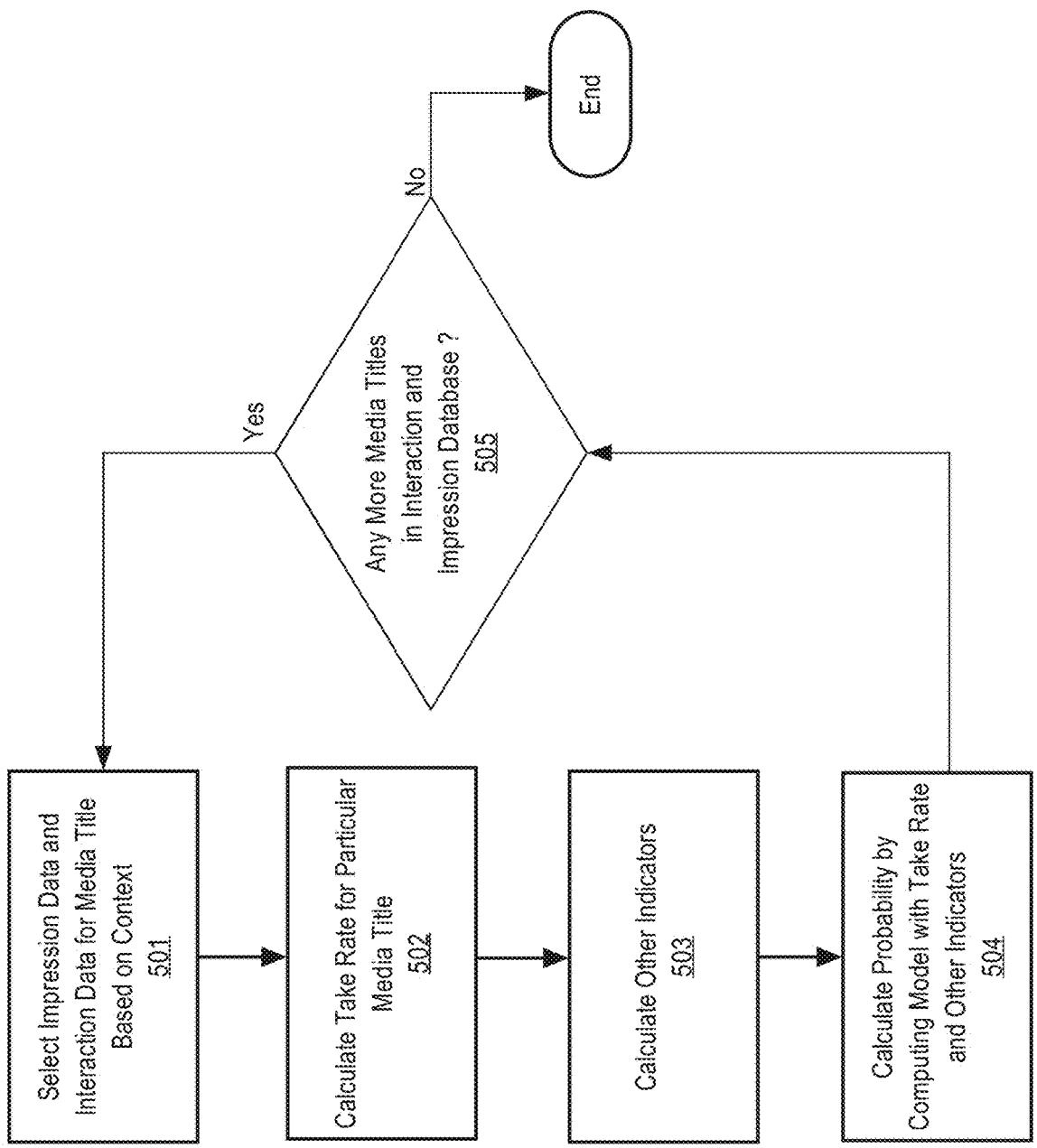
FIG. 5 illustrates a probability generator engine 208 calculating media title probabilities according to an embodiment.

FIG. 5 illustrates a process of calculating media title probabilities according to an embodiment. At block 501, impression data and interaction data are selected for a particular title, for example, by selecting from the impression database 204 and interaction database 206. The context may specify whether additional data needs to be selected from the databases. For example, if the context of the probabilities to be generated is the similarity between media titles and a source title, then impression data and interaction data for the source media title may also be selected. In another embodiment, where the context of probabilities is based on interaction with media titles of a specific genre, then only media titles that belong to the genre are selected. There are many other contexts for selection of media titles, however, the exact type of context of probabilities is not critical to the techniques described herein.

At block 502, take rates for the selected media title are calculated from take rate signals. The techniques discussed in Section 4.0 and 5.0 may be used. Other indicators, if any, may also be calculated for the selected media title at block 503, as described in Section 6.0.

At block 504, the calculated take rates and other indicators are used in a statistical model to produce the probability. In an embodiment, the statistical model may be a Markov chain model. In a related embodiment, the Markov chain model computes a transition probability between the selected title and the source title. The transition probability denotes the likelihood that a user will interact with the selected title after the user has interacted with the source title. A more detailed description of Markov chain model computations for media titles is described in Section 7.1.

In another embodiment, the probability for the selected media title is calculated based on the logistic regression statistical model. The logistic regression model uses the calculated take rates and other indicators for media titles to calculate the selected media title probability. In a related embodiment, the logistic regression model computes a transition probability as the probability for the selected title with respect to the source title. A more detailed description of logistic regression model computations for media titles is described in Section 7.2. In other embodiments, other statistical models may be used that utilize the take rates of the selected media title to compute the probability, however the exact type of model is not critical to the techniques described herein.

At block 505, the operations of blocks 501 through 504 may be repeated for all media titles in the interaction and impression databases. As a result, a complete set of take rates and probabilities may be obtained or calculated.

7.1 Markov Chain Model for Probability Calculation

In an embodiment, the probability of a user watching or interacting with a particular media title next may be calculated using a Markov chain model that utilizes a take rate for the particular media title. In an embodiment, each user interaction with a different media title is modelled as a Markov chain state, and the Markov chain probability is a transition probability of interacting with the particular media title after interacting with a source media title. Since a take rate signal is a factor in a user interactions with the particular media title, the Markov chain probability may be calculated, at least based in part, on a take rate of the particular title. The Markov chain probability for a user interaction with a particular media title j after a user interaction with a source media title i, may be represented by the following equation:

$$MC_{ij} = f(g(x_{ij}))$$

where $MC_{ij}$ is the Markov chain probability and is a function of $g(x_{ij})$, where $g(x_{ij})$ is a modifying function of the title j take rate. The modifying function may be represented by the following equation:

$$g(x_{ij}) = (a + b \times tr)^c$$

where a, b and c are modifier values for the take rate of the particular media title j, tr. The Markov chain probability may be an unmodified function of the title j take rate, and in such case, the modifiers would have values: a=0, b=1 and c=0. In a related embodiment, the Markov chain probability may have a moderate dependency on the take rate and in such case, the modifying function would have relatively moderate modifier values. For example, the modifying function may have a=1, b=1 and c=2 values to yield a moderate dependency on the take rate. In another embodiment, the Markov chain probability may have an aggressive dependency on the take rate, and respectively, in such case, the modifying function would have relatively aggressive modifier values. Such aggressive values may be a=1, b=2 and c=2.

The take rate for a particular media title may be any of the media title take rates as described in Section 4.0 and 5.0, or combination thereof. For example, the modifying function may use the normalized lower bound take rate of the particular media title j in the context of the source media title i as the take rate. In such embodiment, tr is replaced by the cumulative distribution function for lower bound take rates. The resulting modifying take rate function may be represented with the following equation:

$$g(x_{ij}) = (a + b \times F_i(X_j))^c$$

In another embodiment, the Markov chain probability for a particular title may be calculated based on other indicators in addition to the take rate of the particular title. The other indicators may be one or more indicators described in Section 6.0. In a related embodiment, the Markov chain probability for a particular title in a context of a source title may be a function of transition probability, tp, odds ratio, OR, search odds ratio, sor, fraction content viewed, fcv, and modifying take rate function, as described above. In further related embodiment, the Markov chain probability for the media title j in the context of media title i may be represented by the following equation:

$$MC_{ij} = 1 + 10^3 \times tp \times \log\left(OR \times \left(1 + \left(\frac{5 \times sor}{1 + 5 \times sor}\right)\right) \times (fcv + \epsilon) \times g(F_i(X_j))\right).$$

where tp is the transitional probability of user interacting with the media title i and then interacting with the media title j; OR is the odds ratio of interaction sequence between the media title i and j being at random over it being on purpose; sor is the odds ratio of searching for the media title i and then interacting with the media title j being at random over it being on purpose; fcv is a ratio of interaction duration of the media title j over total duration of the media title j, and tp, OR, sor and fcv are computed based on the techniques described in section 6.0.

7.2 Logistic Regression Model for Probability Calculation

In an embodiment, the probability of a user watching or interacting with a particular media title next may be calculated using a logistic regression model that utilizes take rates for the particular media title. A training sample data for the logistic regression model is selected from the interaction and impression databases. The sample data may or may not contain data on the particular media title. The sample data may be selected randomly, while in another embodiment, the sample data may be selected based on a region or based on a popularity of media titles or combination of thereof.

The sample data can be regressed using a logistic regression function of the logistic regression model. The logistic regression function uses a take rate for the particular media as an independent variable. The logistic regression may use any of the take rate types discussed in sections 4.0 and 5.0, alone or in combination, as the dependent variable. For each media title in the sample data, the logistic regression function evaluates to a binomial output of the dependent variable, where the value of 1 denotes the occurrence of the interaction in the sample data and 0 to non-occurrence. The regression function may be represented by the following equation:

$$\log \frac{F_a}{1 - F_a} = \beta_0 + \beta_1(tr_a)$$

where $F_a$ is either 0 or 1 depending on the sample data for a media title a in the sample data; $\beta_0$ and $\beta_1$ are unknown coefficients of the take rate for the media title a. The take rate for media title a may be calculated as described in Section 4.0 and 5.0. In an embodiment, more independent variables may be used representing the different type of take rates with respective coefficients.

Based on the regression of the sample data, the unknown coefficients may be determined. Once the coefficients are calculated, the regression function may be evaluated to calculate the probability of playing any media title, such as a media title j, using the same general form of logistic regression function equation:

$$\log \frac{p_j}{1 - p_j} = \beta_0 + \beta_1(tr_j)$$

where $p_j$ is the calculated probability of user interacting with a media title j. In a related embodiment, more independent variables may be used representing the different type of take rates with respective coefficients.

In another embodiment, a logistic regression model may be used to calculate the probability of an interaction of a particular media title in the context of a source media title. A training sample data for the logistic regression model is selected from the title interaction and the title impression database that contains information on consecutive media title interactions or interactions with media titles after another media title is searched.

The sample data then may be regressed by a logistic regression function of the logistic regression model. A take rate for the particular media in the context of the source media title may serve as an independent variable of the function. In related embodiments, more than one take rates may serve as independent variables. The dependent variable of the function may be the binomial output of occurrence or non-occurrence of the consecutive user interactions with a media title or a search followed by an interaction with a model title. The regression function may be evaluated for unknown coefficients, to $\beta_0$ and $\beta_1$, the following formula:

$$\log \frac{F_{ab}}{1 - F_{ab}} = \beta_0 + \beta_1(tr_{ib})$$

where $F_{ib}$ is either 0 or 1 depending on the sample data for a media title b from the sample data in context of a media title i; and $tr_{ib}$ is a take rate for the media title b in the context of the media title i. The take rate for media title b in the context of media title i may be calculated as described in Section 4.0 and 5.0. In a related embodiment, more independent variables may be used representing the different type of take rates with respective coefficients.

Based on the regression of the sample data, the unknown coefficients may be determined. Once the coefficients are calculated, the regression function may be evaluated to calculate the probability of playing any media title in a context of the source media title, such as a media title j in context of the media title i. The regression function may be represented with the following equation:

$$\log \frac{p_{ij}}{1 - p_{ij}} = \beta_0 + \beta_1(tr_{ij})$$

where $p_{ij}$ is the calculated probability of user interaction with a media title j in context of the media title i.

In a related embodiment, other statistical models, such as a Markov chain model, and more than one type of take rates may be used in a logistic regression model. The logistic regression function, similarly, first calculates the unknown coefficients $\beta_1$, $\beta_2$, $\beta_3$ and $\beta_4$ based on the sample data, and then, using the calculated coefficients, may calculate the probability for any particular media title in context of the source media title. The logistic regression function may be represented by the following equation:

$$\log\left(\frac{p_{ij}}{1 - p_{ij}}\right) = \beta_1(MC_{ij}) + \beta_2(F_{ij}) + \beta_3 tr_{ij} + \beta_4 hpp_{ij}$$

where $p_{ij}$ is the probability; $MC_{ij}$ is the Markov chain probability for a media title j in context of the source media title i, calculated based on techniques described in section 7.1; and $F_{ij}$, $tr_{ij}$, $hpp_{ij}$ are normalized, adjusted and duration based take rates of the media title j in the context of media title i and are calculated based on techniques described in section 4.0 and 5.0.

8.0 Recommendation Engine Functional Overview

Figure 6:
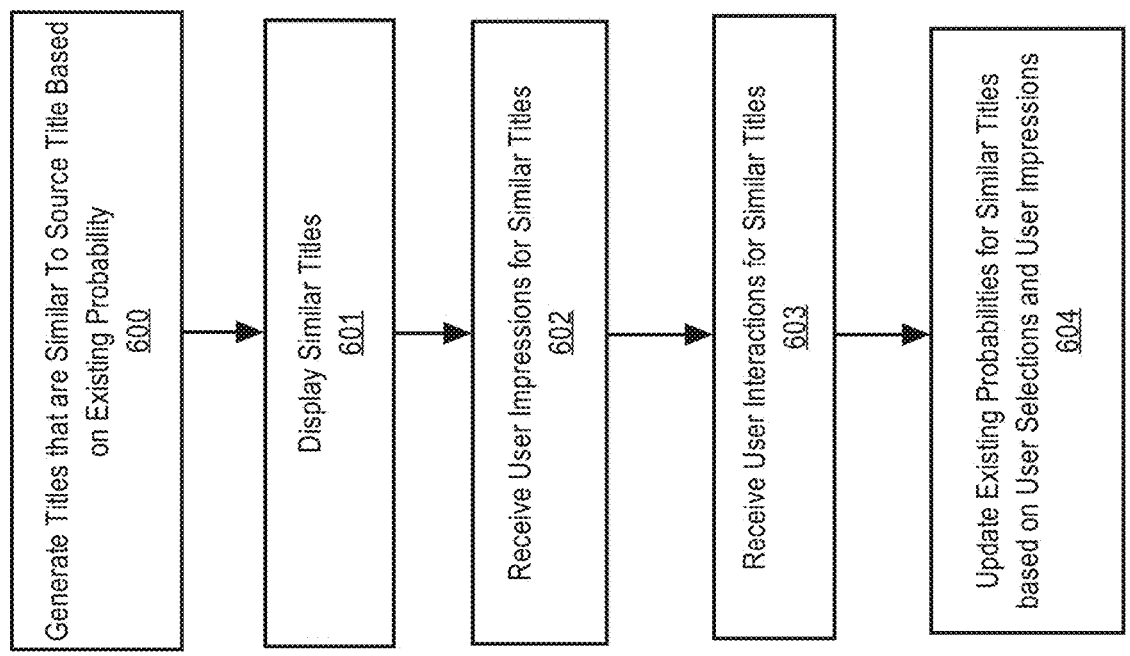
FIG. 6 illustrates a recommendation engine providing title recommendations according to an embodiment.

FIG. 6 illustrates a process of the recommendation engine providing title recommendations according to an embodiment.

At block 600, the recommendation engine 210 identifies one or more recommended titles that are similar to a source media title that a user has interacted previously. In an embodiment, the recommendation engine 210 provides the source media title to the probability generator 208. The probability generator 208, in response, computes probabilities of the user interacting with other, similar, media titles in context of the source media title. The recommendation engine 210 then selects one or more recommended titles based on the similar media titles received from the probability generator 208. For example, the recommendation engine 210 may select the N titles that have the highest probabilities to a media title i. As another example, the recommendation engine 210 may select recommended titles that have similar titles to title i that are above a particular threshold of probability.

At block 601, the recommendation engine 210 provides the one or more recommended titles identified at block 600 to the CB 108. In an embodiment, the recommendation engine 210 sends one or more messages to the CB 108 over the communications network 104 specifying the one or more media titles. The CB 108, in response to receiving the one or more recommended titles from the recommendation engine 210 displays the recommended titles to the user.

At block 602, the application server computer 102 receives user impressions of media titles from the CB 108. In an embodiment, the CB 108 tracks user actions on the CB 108 and records media titles that have been browsed over by users. The CB 108 then sends the information about the browsed media titles as title impression data to the application server computer 102 through the communication network 104. In response to receiving the title impression data from the CB 108, the application server computer 102 stores the data in the impression database 206.

At block 603, the application server computer 102 receives user interactions with media titles from the CB 108. In an embodiment, the CB 108 tracks user actions on the CB 108 and records media titles that have been interacted with by users. The CB 108 then sends the information about the user interacted media titles as title interaction data to the application server computer 102 through the communication network 104. In response to receiving the title interaction data from the CB 108, the application server computer 102 stores the data in the interaction database 204.

At block 604, on a new request from the CB 108, the recommendation engine 210 identifies one or more recommended titles that are similar to the source media title based on the newly received title impression and title interaction data. In an embodiment, similar to the step 601, the recommendation engine requests the probability generator 208 to calculate the similarity probabilities of other media titles to the source media title. The probability generator 208, in response, computes probabilities of the user interacting with other media titles in context of the source media title utilizing the received title interaction and impression data in the title impression and interaction databases.

Each of the processes shown in FIG. 5, FIG. 6 may be implemented, in various embodiments, using one or more computer programs, other software elements, firmware, or a combination thereof that are hosted in or executed by a general-purpose computer. Alternatively, application server computer 102 may be configured as a special-purpose computer in which the processes of FIG. 5, FIG. 6 using special-purpose logic.

9.0 Title Recommendation Display

FIG. 3 illustrates an example menu for displaying the one or more titles recommended by the recommendation engine 210 according to an embodiment.

In FIG. 3, display 300 includes selection window 301, selection window 302, selection window 321 associated with source title A and B, and genre A respectively. Title 303 is included within selection window 301, titles 304, 303 are included within selection window 302, and titles 303, 304 are included in selection window 321. Although only a particular number of each element is depicted in FIG. 3, a practical environment may have more or less of each of the aforementioned elements. For example, the display 300 may include hundreds of selection windows, each corresponding to a different genre or theme. As another example, the display 300 may include only a single selection window containing all recommended titles.

In an embodiment, the CB 108 sorts the one or more titles received from the recommendation engine 210 at block 601 of FIG. 6. The CB 108 may sort the one or more titles by context such as genre, as in selection window 321 or based on previously interacted media titles, as in selection window 301 and 302, or any other applicable theme. The CB 108 then displays the one or more titles in windows, such as selection window 301 and selection window 302, corresponding to the context. In some embodiments, the CB 108 is configured to allow the user to browse and select titles within each category via the selection windows. In related embodiments, where the CB 108 and the MP 110 are an integrated component or are connected through the communication network 104, should the user select title 303 the MP 110 may begin playback of title 303. As another example, title 303 may be presented in the vicinity of one or more options for displaying ratings associated with the title 303, viewing detailed information related to the title 303, adding the title 303 to a queue, submitting a rating for title 303, etc.

In some embodiments, where the CB 108 and the MP 110 are an integrated component or are connected through the communication network 104, the CB 108 provides the display 300 at times when the user may be likely to select a new title for playback or in response to certain user-initiated events. For example, the CB 108 after the user has selected a title may begin playback of the title for the user. Once the CB 108 has finished playback of the title, the CB 108 may provide display 300 to guide the user to titles similar to the title the user had just selected. As another example, the CB 108 may provide, in the vicinity of titles that are available for playback, an option for displaying similar titles. When the option is selected by a user, the CB 108 provides display 300 to guide the user to similar titles.

10.0 Alternative Contexts and Uses

Thus far, the techniques described above have been explained primarily in the context of recommending media titles for a content distribution system. Specifically, the techniques described herein posit that a take rate signal of each media title may affect the content distribution system's recommendation for the each media title and thus affect the media title arrangement in a recommendation display. Since a take rate signal is derived from user impressions and interactions with the content distribution system, the media titles may be recommended to a user based on browsing patterns of other users of the content distribution system. Such model is not specific to content distribution systems and may be applied to many different systems in many different contexts.

For example, in order to recommend products for purchase, a product recommendation system may similarly collect user product browsing and purchase history as a take rate signal. By following the techniques described herein, the product recommendation system can then recommend similar products based on the take rate signal.

In the abstract, as long as the system has an ability to track and record the impressions and interactions of the items or services the system offers, the system may capture a take rate signal for those offerings. Accordingly, the system may use the take rate signal to calculate various take rates using techniques described herein. Then, the system may similarly utilize various statistical models to improve the recommendations of the items or services to users of the system, again by using techniques described herein.

11.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
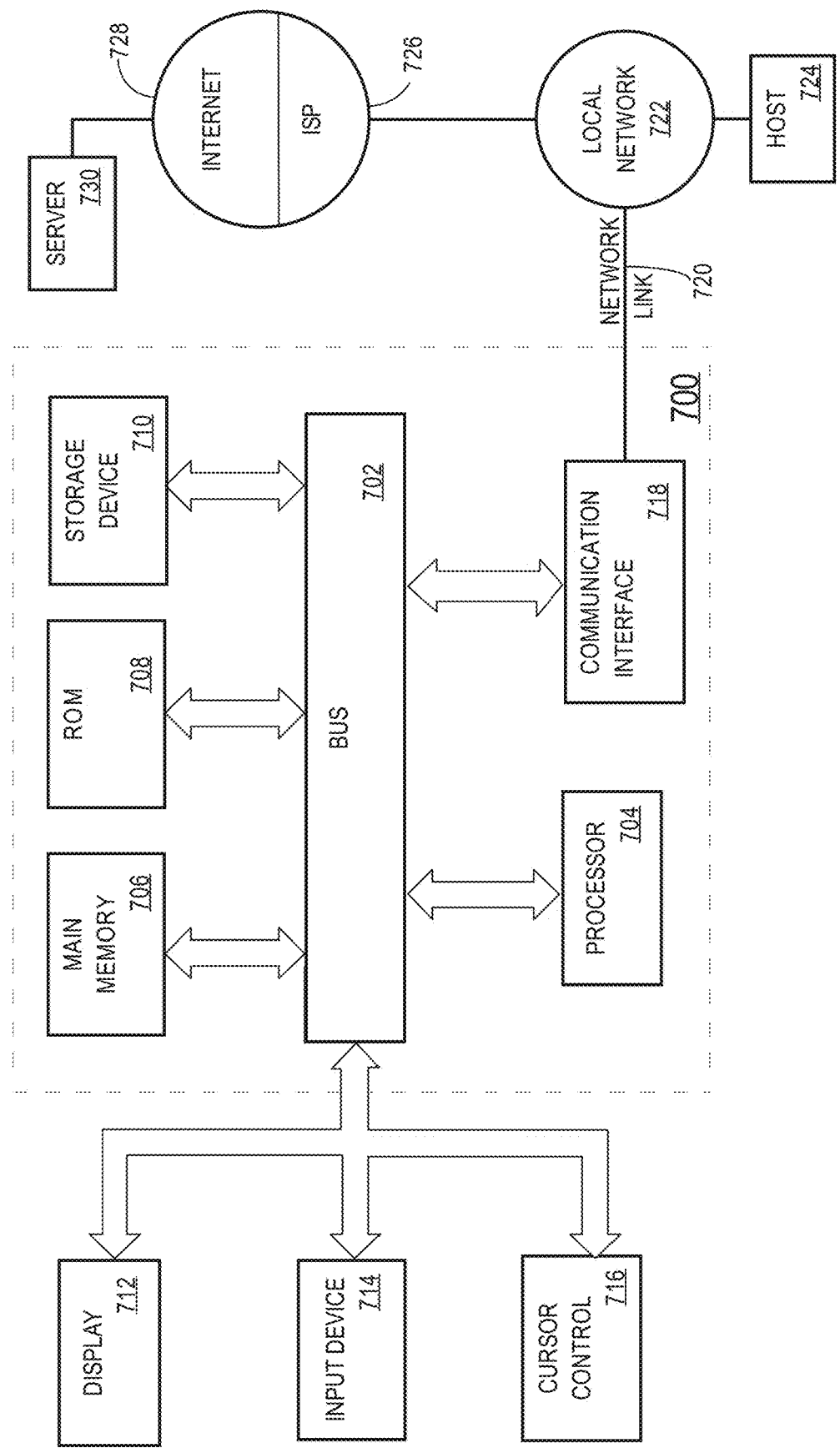
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

12.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
transmitting, to a plurality of browsers of client computers, an ordered set of titles from a library of titles;
receiving, from the plurality of browsers, impressions data indicating a plurality of impressions associated with a first title in the ordered set of titles, wherein a given impression in the plurality of impressions is automatically recorded in response to an affirmative input from browsing over the first title in a given browser in the plurality of browsers, wherein the affirmative input includes a user input indicating hovering over the first title or a user input indicating scrolling over the first title;
based on the impressions data, determining a location of the first title in a second ordered set of titles from the library of titles; and
causing the second ordered set of titles to be displayed via a browser on a client computer.

2. The computer-implemented method of claim 1, further comprising determining the location of the first title in the second ordered set of titles based on a total number of interactions with the first title.

3. The computer-implemented method of claim 1, further comprising determining the location of the first title in the second ordered set of titles in based on a total number of impressions of the first title.

4. The computer-implemented method of claim 1, further comprising determining the location of the first title in the second ordered set of titles based on a shared context of interactions and the plurality of impressions associated with the first title.

5. The computer-implemented method of claim 1, further comprising determining the location of the first title in the second ordered set of titles based on durations of interactions with the first title.

6. The computer-implemented method of claim 1, further comprising determining the location of the first title in the second ordered set of titles based on a frequency of occurrence of the first title in the ordered sets of titles.

7. The computer-implemented method of claim 1, further comprising determining the location of the first title in the second ordered set of titles based on a number of consecutive interactions with the first title after an interaction with a particular source title included in the second ordered set of titles.

8. The computer-implemented method of claim 1, wherein the second ordered set of titles is related to a source title based on a plurality of stored probability values, and wherein each probability value in the plurality of stored probability values represents, for each title of the second ordered set of titles, a likelihood of selecting the title after viewing the source title.

9. The computer-implemented method of claim 8, further comprising calculating, based on the impressions data, and from the plurality of stored probability values, a particular probability value corresponding to the first title to determine the location of the first title in the second ordered set of titles.

10. The computer-implemented method of claim 9, further comprising calculating the particular probability value based on at least one of a Markov chain statistical model or a logistic regression statistical model.

11. A non-transitory computer-readable medium storing instructions that, when executed by a processor, cause the processor to:
transmit, to a plurality of browsers of client computers, an ordered set of titles from a library of titles;
receive, from the plurality of browsers, impressions data indicating a plurality of impressions associated with a first title in the ordered set of titles, wherein a given impression in the plurality of impressions is automatically recorded in response to an affirmative input from browsing over the first title in a given browser in the plurality of browsers, wherein the affirmative input includes at least a user input indicating hovering over the first title or a user input of scrolling over the first title,
based on the impressions data, determine a location of the first title in a second ordered set of titles from the library of titles; and
cause the second ordered set of titles to be displayed via a browser on a client computer.

12. The non-transitory computer-readable medium of claim 11, wherein the instructions further cause the processor to determine the location of the first title in the second ordered set of titles based on a total number of interactions with the first title.

13. The non-transitory computer-readable medium of claim 11, wherein the instructions further cause the processor to determine the location of the first title in the second ordered set of titles based on a total number of impressions of the first title without interactions with the first title.

14. The non-transitory computer-readable medium of claim 11, wherein the instructions further cause the processor to determine the location of the first title in the second ordered set of titles based on a shared context of interactions and the plurality of impressions associated with the first title.

15. The non-transitory computer-readable medium of claim 11, wherein the instructions further cause the processor to determine the location of the first title in the second ordered set of titles based on durations of interactions with the first title.

16. The non-transitory computer-readable medium of claim 11, wherein the instructions further cause the processor to determine the location of the first title in the second ordered set of titles based on a frequency of occurrence of the first title in the ordered sets of titles.

17. The non-transitory computer-readable medium of claim 11, wherein the instructions further cause the processor to determine the location of the first title in the second ordered set of titles based on a number of consecutive interactions with the first title after an interaction with a particular source title included in the second ordered set of titles.

18. The non-transitory computer-readable medium of claim 11, wherein the ordered set of titles is related to a source title based on a plurality of stored probability values, and wherein each probability value in the plurality of stored probability values represents, for each title of the second ordered set of titles, a likelihood of selecting the title after viewing the source title.

19. The non-transitory computer-readable medium of claim 18, wherein the instructions further cause the processor to calculate, based on the impressions data and the plurality of stored probability values, a particular probability value corresponding to the first title to determine the location of the first title in the second ordered set of titles to display in the browser of the client computer.

20. A computer system, comprising:
a memory storing instructions; and
a processor executing the instructions to:
- transmit, to a plurality of browsers of client computers, an ordered set of titles from a library of titles;
- receive, from the plurality of browsers, impressions data indicating a plurality of impressions associated with a first title in the ordered set of titles, wherein a given impression in the plurality of impressions is automatically recorded in response to an affirmative input from browsing over the first title in a given browser in the plurality of browsers, wherein the affirmative input includes at least a user input indicating hovering over the first title or a user input of scrolling over the first title,
- based on the impressions data, determine a location of the first title in a second ordered set of titles from the library of titles; and
- cause the second ordered set of titles to be displayed via a browser on a client computer.

* * * * *